(12) United States Patent
Sugimoto et al.

(10) Patent No.: US 6,648,494 B2
(45) Date of Patent: Nov. 18, 2003

(54) VEHICLE LAMP AND ROTARY DRIVING APPARATUS

(75) Inventors: Atsushi Sugimoto, Shizuoka (JP); Keiichi Tajima, Shizuoka (JP); Kazuma Mochizuki, Shizuoka (JP); Tsutomu Takiguchi, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 0 days.

(21) Appl. No.: 09/990,495

(22) Filed: Nov. 21, 2001

(65) Prior Publication Data

US 2002/0064051 A1 May 30, 2002

(30) Foreign Application Priority Data

Nov. 24, 2000 (JP) ..................... P2000-358008

(51) Int. Cl.[7] .............................................. F21V 19/02
(52) U.S. Cl. ..................... 362/524; 362/526; 362/531; 362/513; 362/514
(58) Field of Search ................. 362/287, 467, 362/524, 526, 427, 418, 285, 530, 35, 531, 512, 513, 514, 322, 324

(56) References Cited

U.S. PATENT DOCUMENTS

| | | | | |
|---|---|---|---|---|
| 2,288,177 A | * | 6/1942 | Bailey | 362/35 |
| 3,117,302 A | * | 1/1964 | Cardarelli et al. | 362/35 |
| 4,320,385 A | * | 3/1982 | Bleiweiss et al. | 362/35 |
| 4,387,362 A | * | 6/1983 | Gosswiller | 362/35 |
| 4,663,696 A | | 5/1987 | Miyazawa et al. | 362/80 |
| 4,717,991 A | * | 1/1988 | Murphree, Jr. | 362/35 |
| 4,755,709 A | | 7/1988 | De Jager | |
| 4,827,388 A | | 5/1989 | Miyazawa | 362/284 |
| 4,831,506 A | | 5/1989 | Miyazawa | 362/284 |
| 5,339,224 A | * | 8/1994 | Woehler | 362/35 |
| 5,412,543 A | | 5/1995 | Kobayashi et al. | 362/66 |
| 5,469,008 A | | 11/1995 | Nakajima et al. | |
| 5,957,562 A | * | 9/1999 | Hill | 362/35 |
| 5,982,064 A | | 11/1999 | Umeda et al. | |

FOREIGN PATENT DOCUMENTS

| | | | |
|---|---|---|---|
| GB | 1116293 | 6/1968 | |
| GB | 2172753 | 9/1986 | |
| GB | 2172753 A | 9/1986 | H02K/21/16 |

OTHER PUBLICATIONS

British Examination Report dated Mar. 5, 2003.
Combined Search and Examination Report.

* cited by examiner

Primary Examiner—Thomas M. Sember
(74) Attorney, Agent, or Firm—Fish & Richardson P.C.

(57) ABSTRACT

A vehicle lamp includes an optical means whereof the direction of irradiation is change by rotation, a motor, an output shaft for driving the optical means, and a rotation transmitting mechanism for transmitting rotation from the motor to the output shaft. The motor, the output shaft, and the rotation transmitting mechanism are accommodated in the case body, and a revolving shaft of the motor is supported by the case body.

16 Claims, 7 Drawing Sheets

VEHICLE LAMP AND ROTARY DRIVING APPARATUS

BACKGROUND OF THE INVENTION

1. Field of the Invention

The present invention relates to a novel vehicle lamp and a rotary driving apparatus. More specifically, the present invention relates to a technique for accurately defining inter-shaft pitches in a rotation transmitting mechanism located between an output shaft for rotating optical means and a motor.

2. Description of the Related Art

In a vehicle lamp containing optical means, a motor may be employed as a driving source of the rotary driving apparatus for rotating the optical means.

When a brushless motor is employed and a printed board with circuit elements for driving the motor formed thereon is used for supporting a revolving shaft of the motor, the position of the supporting shaft of each gear for transmitting rotation from the motor to the output shaft cannot be defined accurately because the printed board is not manufactured to have a plurality of shaft members arranged in accurate pitches. Therefore, inter-shaft pitches are not possible, and rotation cannot be transmitted smoothly, leading to problems such as torque loss and undesirable noise.

SUMMARY OF THE INVENTION

An object of the present invention is to accurately define the inter-shaft pitches in a rotation transmitting mechanism located between an output shaft for rotating optical means, whereof the direction of irradiation is changed by rotation, and a motor.

The vehicle lamp according to an implementation of the present invention comprises an optical means whereof the direction of irradiation is changed by rotation, a motor, an output shaft for driving the optical means, and a rotation transmitting mechanism for transmitting rotation from the motor to the output shaft. The motor, the output shaft, and the rotation transmitting mechanism are accommodated in the case body, and the revolving shaft of the motor is supported by the case body.

The relative position of each shaft depends on the precision of the casing, which also supports the output shaft and the shaft of the rotation transmitting mechanism. Therefore, according to an implementation of the present invention, inter-shaft pitches can be accurately defined by increasing the dimensional precision of the mold for the case body.

DETAILED DESCRIPTION OF THE PREFERRED EMBODIMENTS

Figure 1:
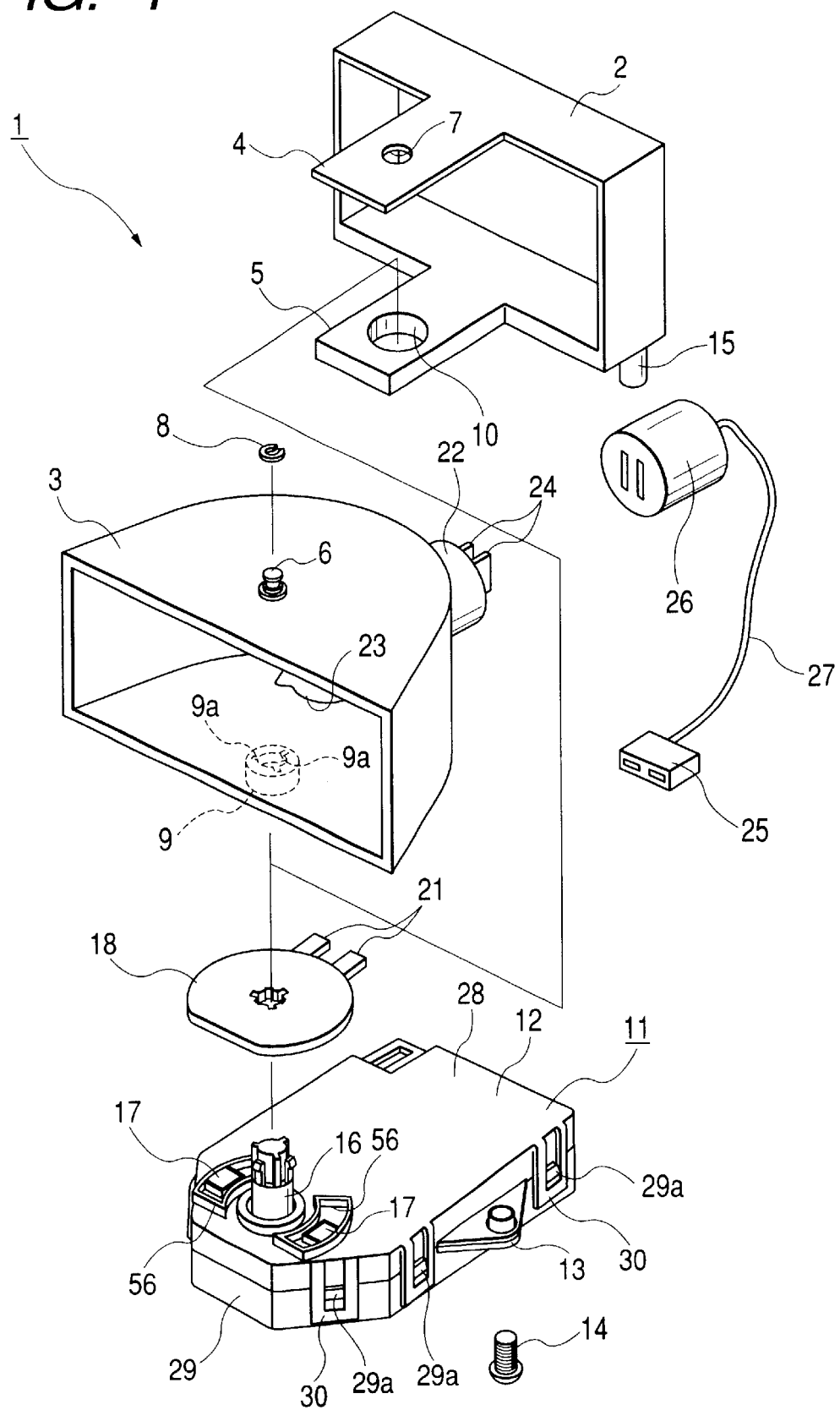
FIG. 1 is a general exploded perspective view according to an embodiment of the present invention.

Referring now to the drawings, one embodiment of the present invention will be described.

The vehicle lamp 1 includes a lamp body 3 rotatably supported by a bracket 2 fixed on the vehicle body. The bracket 2 includes two supporting arms 4, 5 opposing at a distance vertically with each other, and a lamp body 3 is rotatably supported at the tips of the supporting arms 4, 5. More specifically, a shaft 6 is projecting from the upper surface of the lamp body 3, and the shaft 6 is inserted into the insertion hole 7 formed at the tip portion of the upper supporting arm 4, and a securing washer 8 is engaged on the portion of the shaft 6 projecting upwardly from the insertion hole 7. The upper portion of the lamp body 3 is rotatably supported by the supporting arm 4. The lamp body 3 is formed with a connecting hole 9 opened at the bottom portion thereof. The connecting hole 9 is formed with grooves 9a, 9a, 9a extending in the axial direction for positioning in the direction of rotation. The connecting hole 9 is faced downward through the insertion hole 10 formed at the tip portion of the lower supporting arm 5 (See FIG. 1).

A driving unit 11 is fixed on the lower side of the lower supporting arm 5 of the bracket 2. The driving unit 11 is constructed so that required members and components are accommodated in or supported by the case body 12, respectively. Fixing strips 13 project from the side surfaces of the case body 12, and fixing screws 14 inserted through the fixing trips 13 from below are engaged with the fixing bosses 15 projecting from the lower surface of the supporting arm 5, thereby fixing the driving unit 11 below the lower supporting arm 5 of the bracket 2 (See FIG. 1).

A revolving shaft 16 projects from the upper surface of the case body 12 of the driving unit 11, and fixed contact points 17 are disposed at the position near the revolving shaft 16 (See FIG. 1). These fixed contact points 17 are connected to the power source. In other words, one of the fixed contact points 17 is connected to the battery via a lighting switch, which is not shown, and the other one is grounded.

The revolving shaft 16 is connected to the connecting hole 9 opened on the lower surface of the lamp body 3 through the insertion hole 10 formed on the lower supporting arm 5 of the bracket 2. A contact plate 18 is mounted on the revolving shaft 16 on the portion located below the supporting arm 5. The lower surface 19 of the contact plate 18 is formed with rotary contact points 20 being arc-shape on both sides of the central portion (See FIG. 4), and when the contact plate 18 is mounted on the revolving shaft 16, the rotary contact points 20 are brought into contact with the fixed contact points 17 respectively. Connector pins 21 connected to the rotary contact points 20 project from the rear end of the contact plate 18 (See FIG. 1).

A light source bulb 23 is mounted at the rear portion of the lamp body 3 via a bulb socket 22 that is detachable with respect to the lamp body 3, and connector pins 24 projecting from the rear end of the bulb socket 22 and the connector pins 21 projecting from the contact plate 18 are electrically connected via the power supply cable 27 having connectors 25, 26 at both ends thereof (See FIG. 1). The light source bulb 23 is connected to the power supply via the fixed contact points 17, the rotary contact points 20, and the power supply cable 27. The rotary contact points 20 slides with respect to the fixed contact points 17. Thus, even when the lamp body 3 rotates, the connections from the power source to the light source bulb 23 are not disconnected.

In the vehicle lamp 1 described above, when the driving unit 11 is driven and the revolving shaft 16 rotates, the lamp body 3 mounted on the drive shaft 16 rotates, and the direction of irradiation varies in the horizontal direction. Even when the lamp body 3 rotates in this way, the power supply cable 27 rotates with the lamp body in its entirety. Therefore, no kinking of the power supply cable 27 occurs, and no stress is exerted on the power supply cable 17 with rotation of the lamp body 3.

The vehicle lamp 1 can be used in various ways. For example, a transparent cover or a lens can be mounted at the front opening of the lamp body 3 such that the lamp 1 can be used independently, or the lamp 1 can be combined and used with a different lamp and mounted in a large sized lamp housing.

Figure 2:
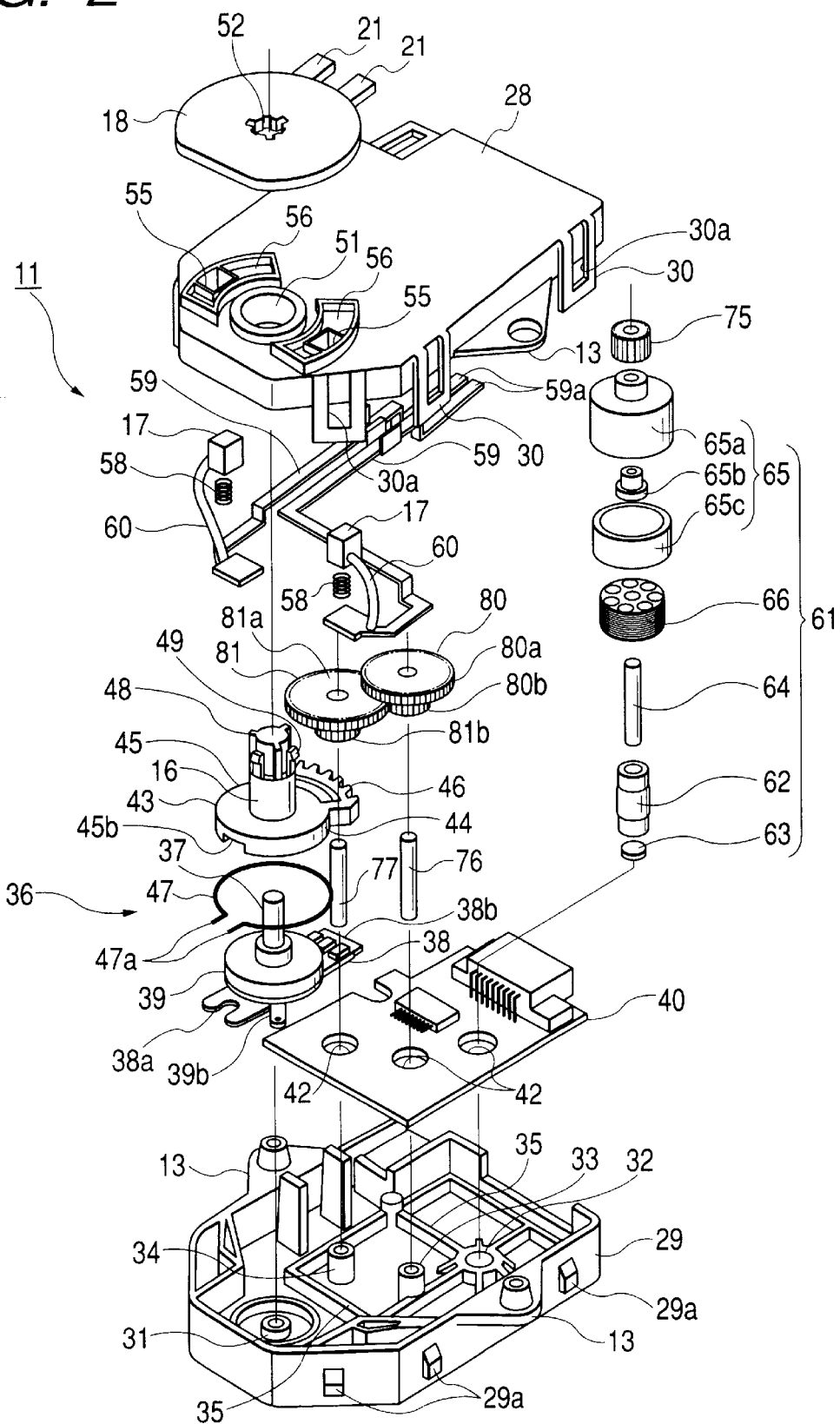
FIG. 2 is an exploded perspective view of the driving unit according to an embodiment of the present invention.

Referring to FIG. 2, the detail description of the driving unit 11 will be explained.

The driving unit 11 is constructed of the required members or components arranged or supported in the case body 12. The case body 12 comprises an upper half 28 and the lower half 29 connected with each other. Connecting strips 30 project downward from the peripheral edge of the upper half 28, and the connecting strips 30 are formed with engaging holes 30a. The lower half 29 comprises engaging projections 29a projected on the side surface, and the upper and lower halves 28, 29 are joined by engaging the engaging projections 29a of the lower half 9 with the engaging holes 30a of the connecting strips 30 with the side wall of the upper half 28 and that of the lower half 29 abutted against with each other so that the case body 12 is formed (See FIG. 12).

The bottom surface of the lower half 29 is formed of bosses 31, 32, 33, 34 for receiving a shaft, and a rib 35 for placing a board (See FIG. 2).

The boss 31 for receiving a shaft receives the fixed shaft 37 of the potentiometer 36 so as to stand upward therefrom. The potentiometer 36 comprises a baseboard 38, a rotary disk 39, and the fixed shaft 37, and the fixed shaft 37 is fixed on the baseboard 38. The rotary disk 39 is rotatably supported by the fixed shaft 37 in a state of being in contact with the upper side of the baseboard 38 (See FIG. 3). A variable resistor is constructed by a resistive conductor not shown formed on the baseboard 38 and a bridging contact, not shown, formed on the rotary disk 39, so that the value of resistance corresponding to the angle of rotation of the rotary disk 39 with respect to the baseboard 38 is supplied.

Figure 3:
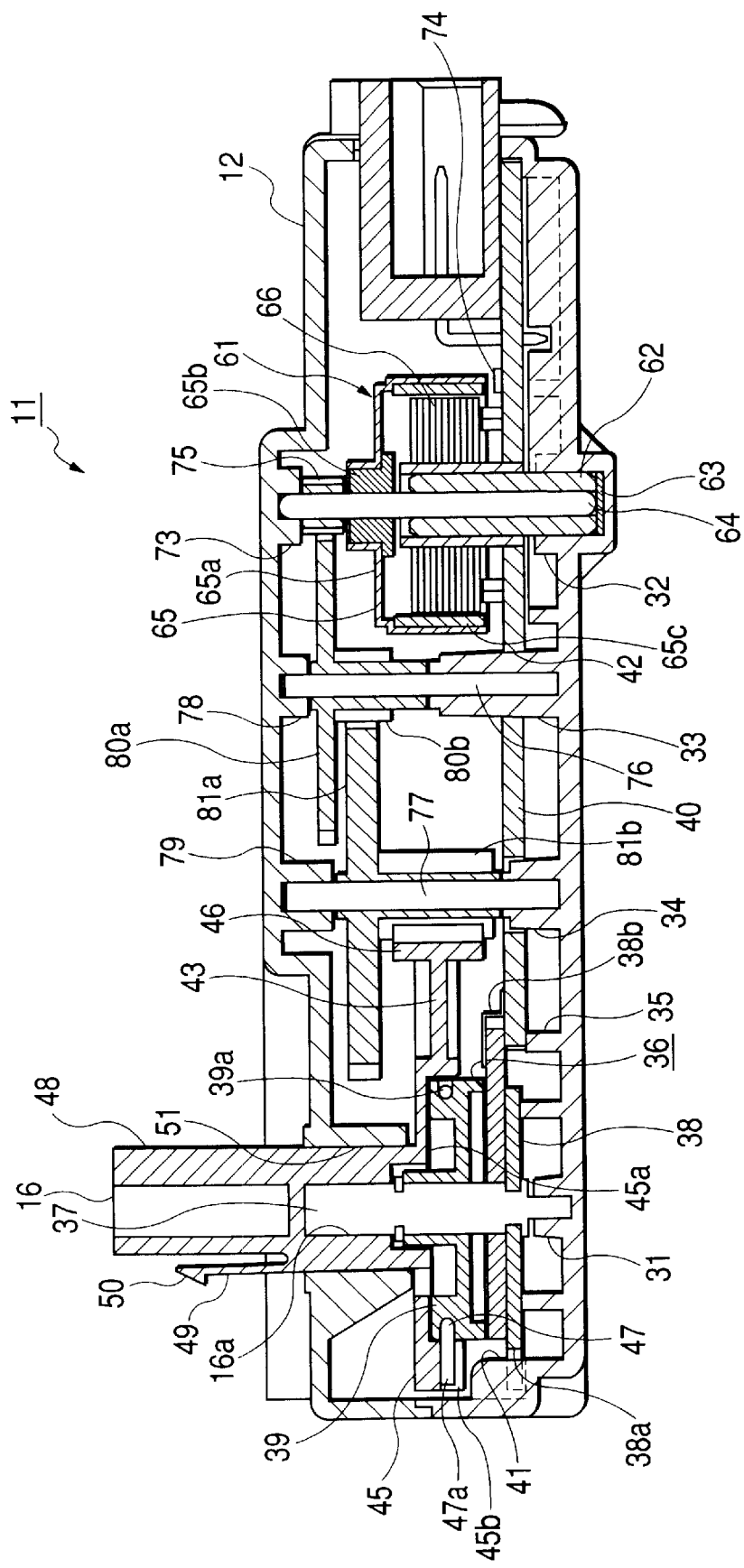
FIG. 3 is a cross sectional view of the driving unit taken along the shaft of each gear according to an embodiment of the present invention.

An engaging notch 38a is formed at one end of the baseboard 38 and a connecting terminal 38b is formed at the other end of the baseboard 38 (See FIG. 2 and FIG. 3).

A groove 39a is formed on the outer peripheral surface of the rotary disk 39, and a projection 39b for adjustment having a hole projects from the side surface of the rotary disk 39 (See FIG. 2 and FIG. 3).

The portion of the fixed shaft 37 of the potentiometer 36 near the lower end is calked and fixed to the baseboard 38, and the portion of the fixed shaft 37 projecting downward from the baseboard 38 is press fitted into the boss 31 for receiving the shaft formed on the lower half 29 (See FIG. 3). The connecting terminal 38b is connected to the prescribed conductor on the printed board 40, and the engaging notch 38a is engaged with the positioning projection 41 formed on the lower half 29, so that the orientation of the baseboard 38 with respect to the lower half 29 is defined (See FIG. 2, FIG. 3).

The printed board 40 is placed on the rib 35 for placing a board formed on the lower half 29. The printed board 40 is formed with insertion holes 42 at the positions corresponding to the bosses 32, 33, and 34 for receiving the shaft respectively (See FIG. 2, FIG. 3).

An output rotating member 43 is rotatably supported by the fixed shaft 37 of the potentiometer 36. The output rotating member 43 is formed with the revolving shaft 16 integrally projecting from the center of the output gear portion 44, and the output gear portion 44 comprises a disk portion 45 and a sector gear 46 projected from the side surface of the disk portion 45 formed integrally with each other (See FIG. 2).

The lower surface of the disk portion 45 of the output gear portion 44 is formed with a circular recess 45a, and the rotary disk 39 of the potentiometer 36 is positioned within the recess 45a. The lower peripheral edge of the disk portion 45 is formed with an engaging notch 45b in communication with the recess 45a. The revolving shaft 16 is formed with a supported hole 16a opening toward the recess 45a, and the fixed shaft 37 of the potentiometer 36 is rotatably inserted into the supported hole 16a. Thus, the output rotating member 43 is rotatably supported by the fixed shaft 37 of the potentiometer 36 (See FIG. 3).

A connecting spring 47 is interposed between the rotary disk 39 of the potentiometer 36 and the disk portion 45 of the output gear portion 44 as clutch means. The connecting spring 47 is formed by curving a linear spring material into ring-shape and bending both ends 47a outward to be parallel with each other (See FIG. 2).

The diameter of the connecting spring 47 before assembly is smaller than that of the groove 39a formed on the rotary disk 39 of the potentiometer 36. Therefore, when it is engaged in the groove 39a, it tightens the groove 39a by its resiliency, and both ends 47a engage with the engaging notch 45b of the disk portion 45 of the output gear portion 44 (See FIG. 3). Accordingly, rotation of the output gear portion 44 is transmitted to the connecting spring 47, and rotation of the connecting spring 47 is transmitted to the rotary disk 39 by friction between the connecting spring 47 and the rotary disk 39. Therefore, when one of the output gear portion 44 and the rotary disk 39 rotates with rotation of the other one restrained, slippage occurs between the connecting spring 47 and the rotary disk 39.

The upper half of the revolving shaft 16 formed integrally with the output gear portion 44 is formed with projecting ridges 48 extending in the axial direction at regular intervals in the circumferential direction, and engaging arm strips 49 between these projecting ridges 48 (See FIG. 2). The engaging arm strip 49 extends in the axial direction at a distance from the outer peripheral surface of the revolving shaft 16, the lower end of which is connected to the revolving shaft 16 and the upper end of which is a free end. The upper end of the engaging arm strip 49 is at the position lower than the upper end of the revolving shaft 16, and the upper end is formed with an engaging claw 50 projecting outward (See FIG. 3).

The upper half 28 is formed with an shaft-insertion hole 51 (See FIG. 2 and FIG. 3), and the upper half of the revolving shaft 16 projects upward from the shaft-insertion hole 51 (See FIG. 3).

Figure 4:
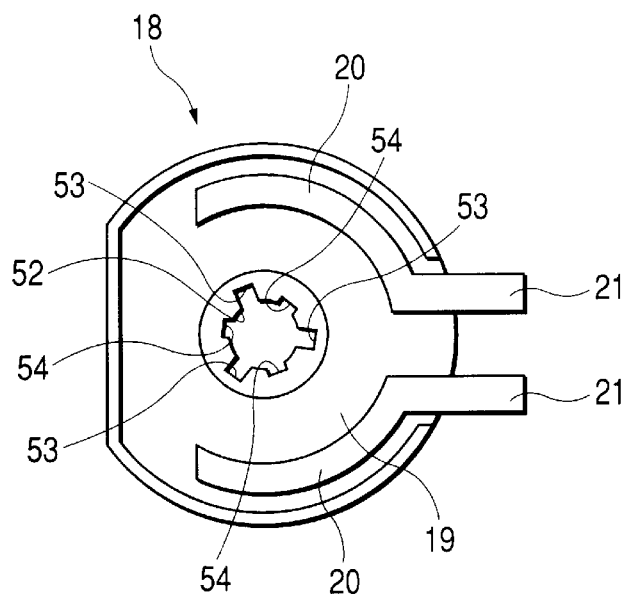
FIG. 4 is an enlarged bottom view of the contact plate according to an embodiment of the present invention.

The connecting hole 52 is formed at the center of the contact board 18, and the connecting hole 52 is formed with insertion notches 53 at regular intervals in the circumferential direction, and engaging notches 54 are formed between these insertion notches 53 (See FIG. 2 and FIG. 4).

The revolving shaft 16 is inserted into the connecting hole 52 on the contact board 18. Concurrently, the relative position in the direction of rotation of the contact board 18 with respect to the revolving shaft 16 is defined by the projecting ridges 48 of the revolving shaft 16 inserted into the insertion notches 53 of the contact board 18. When the bevels of the engaging claws 50 of the engaging arm strips 49 are pressed by the back edges of the engaging notches 54 of the contact board 18, the upper end portions of the engaging arm strips 49 bow toward the center of the revolving shaft 16. Then, the engaging notches 54 are released downward from the engaging claws 50, and subsequently, bowed engaging arm strips 49 return to the original positions, and then their engaging claws 50 engage with the engaging notches 54 of the contact board 18. Thus, the contact board 18 is prevented from falling off the revolving shaft 16, and the maximum height of the contact board 18 with respect to the revolving shaft 16 is defined.

The portion of the revolving shaft 16 projecting upward from the contact board 18 is inserted into the insertion hole 10 formed on the lower supporting arm 5 of the bracket 2 and fitted in the connected hole 9 of the lamp body 3. Concurrently, the relative position in the direction of rotation of the lamp body 3 with respect to the revolving shaft 16 is defined by the projecting ridges is 48 of the revolving shaft 16 being engaged with the grooves 9a of the connecting hole 9.

A brush-insertion holes 55 are formed at the positions of the upper half 28 of the case body 12 corresponding to both sides of the shaft-insertion hole 51. A recess 56 are formed in such a manner that they surround the brush-insertion holes 55.

Figure 5:
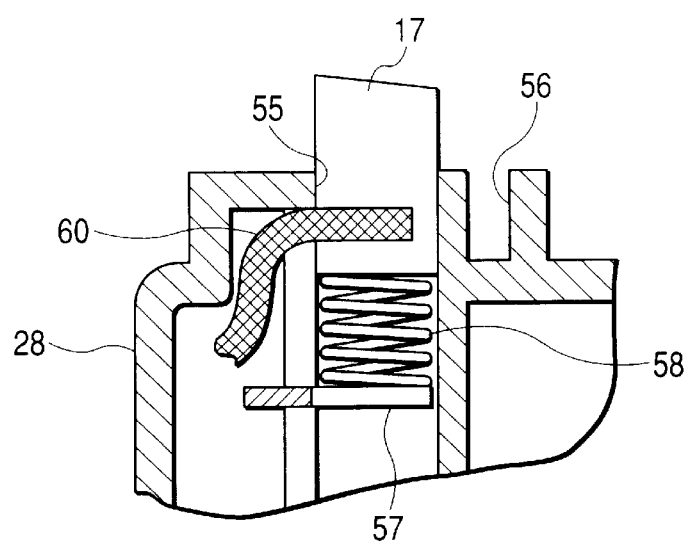
FIG. 5 is an enlarged cross sectional view showing a fixed contact point according to an embodiment of the present invention.

Generally prism shaped brushes are slidably inserted into the brush-insertion holes 55 on the upper half 28 as the fixed contact points 17. Supporting walls 57 are formed on the inside of the upper half 28 at the positions opposing to the brush-insertion holes 55, and coil springs 58 are interposed between the supporting walls 57 and the brushes 17 (See FIG. 5). Accordingly, the brushes 17 are brought into resilient contact with rotary contact points 20 formed on the contact board 18, which ensures electrical connection between the brushes (fixed contact points) 17 and the rotary contact points 20. Since the maximum height of the contact board 18 with respect to the revolving shaft 16 is defined by the engagement between the engaging claws 50 of the engaging notches 54 and the engaging arm strips 49 of the revolving shaft 16, the maximum height thereof with respect to the brushes 17 supported by the case body 12 as well as the revolving shaft 16 is also defined, thereby preventing occurrence of defective contact between the brushes 17 and the fixed is contact points 20, 20.

Conductive boards 59 formed of conductive metal plate are supported on the inner surface of the upper half 28, and one of the ends of the conductive boards 59 are connected to the brushes 17 by wires 60. The other ends 59a of the conductive boards 59 serve as contacts for a connector, and thus the conductive boards 59 are connected to the power supply via the connector, not shown. In other words, one of the conductive boards 59 is connected with the buttery via the lighting switch, not shown, and the other one is grounded.

A brushless motor 61 is disposed in the case body 12 as a driving source. The lower end of a bearing sleeve 62 is press fitted in the boss 32 for receiving a shaft 32 of the lower half 29. A thrust bearing 63 is fitted on the bottom of the boss hole of the boss 32 for receiving a shaft 32 (See FIG. 2 and FIG. 3).

The bearing sleeve 62 rotatably supports the revolving shaft 64. A rotor 65 is fixed on the revolving shaft 64. The rotor 65 includes a rotor case 65a in the shape of a cylinder closed on the upper surface and short in the axial length, a rotor boss 65b fixed at the center of the upper end portion of the rotor case 65a, and a rotor magnet 65c fixed on the inner peripheral surface of the rotor case 65a alternately magnetized in the circumference direction. A rotor boss 65b is press fitted in the portion projecting from the upper end of the bearing sleeve 62 of the revolving shaft 64, thereby fixing the rotor 65 on the revolving shaft 64 (See FIG. 2 and FIG. 3).

A stator coil 66 fitted on the outer periphery of the bearing sleeve 62 to face toward the rotor magnet 65c is fixed on the printed board 40. The magnetic center between the stator coil 66 and the rotor magnet 65c is vertically shifted. Thus, a repulsive force exerts a force that pushes downward (preloaded) on the revolving shaft 64, and the lower end of the revolving shaft 64 is brought into contact with the thrust bearing 63. This eliminates backlash of the revolving shaft 64, and thus the backlash of the rotor 65. The upper end of the revolving shaft 64 is rotatably received in the bearing 73 formed on the lower surface of the upper half 28 (See FIG. 2 and FIG. 3).

The bearing sleeve 62 is inserted into the insertion hole 42 formed on the printed board 40, the a hall element 74 is disposed on the upper surface of the printed board 40 at the position facing toward the lower end of the rotor magnet 65c (See FIG. 3).

A driving gear 75 is fixed at the upper end of the revolving shaft 64 (See FIG. 2 and FIG. 3).

The stator coil 66 is fixed to the printed board 40 in the following manner.

Figure 7:
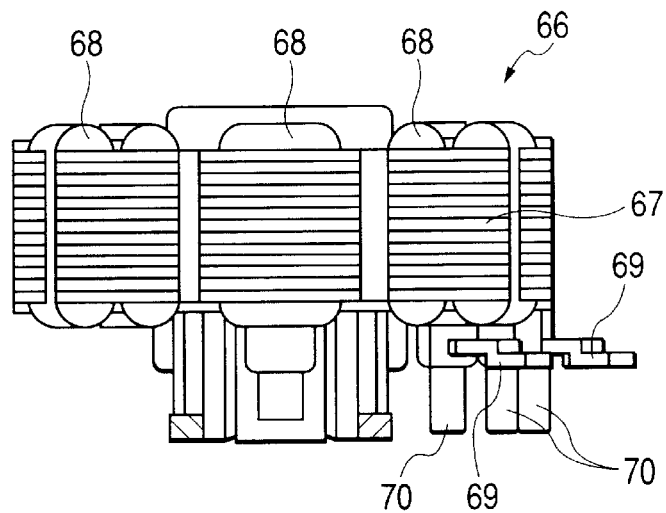
FIG. 7 shows a side view of a stator coil of the motor according to an embodiment of the present invention.
Figure 8:
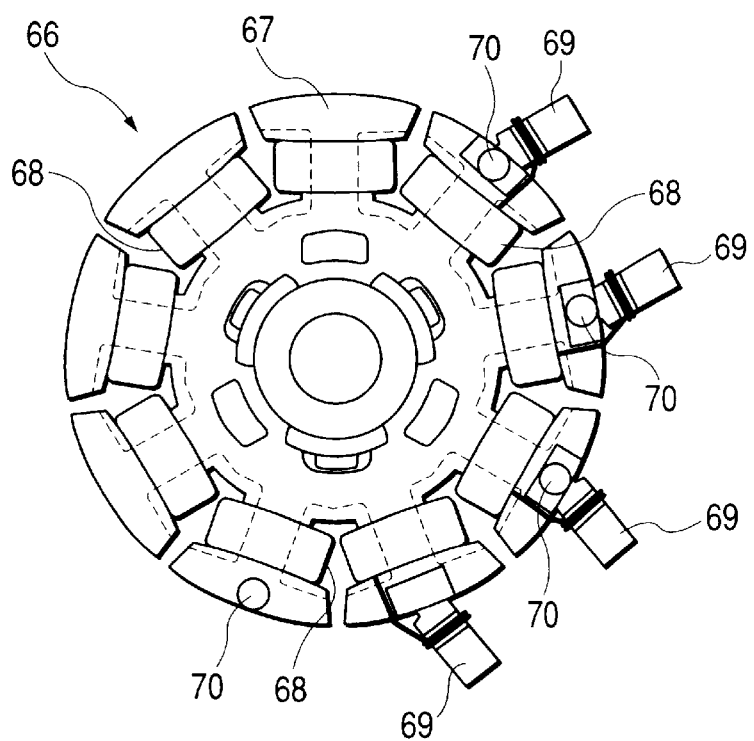
FIG. 8 is a bottom view of FIG. 7.
Figure 9:
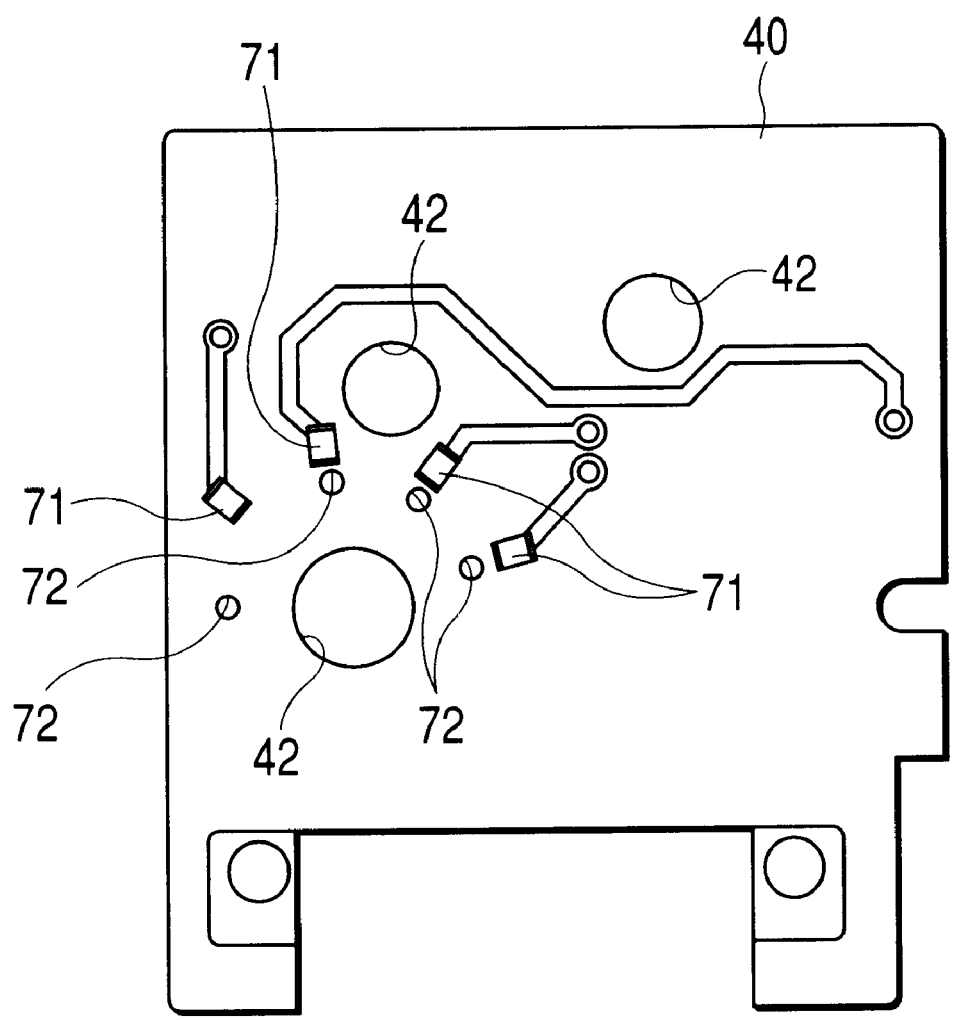
FIG. 9 is a schematic plan view of the printed board according to an embodiment of the present invention.

The stator coil 66 is constructed of winding wires 68 wound on the core 67 in three phases as shown in FIG. 7 and FIG. 8, and the respective winding wires 68 are connected to the contact legs 69 (four contact legs including contact points for supplying a power to the three phases of winding wires 68 and a neutral point) for supplying a power to the winding of each phase. The stator coil 66 is formed with positioning projections 70 projecting downward.

On the other hand, connecting lands 71 and positioning holes 72 are formed on the upper surface of the printed board 40 at the position surrounding the insertion hole 42 through which the bearing sleeve 62 is to be inserted.

Then the positioning projections 70 of the stator coil 66 are inserted into the positioning holes 72 of the printed board 40. Accordingly, the stator coil 66 is positioned with respect to the printed board 40, and the respective contact legs 69 are placed on the connecting lands 71 of the printed board 40. Then, the respective contact legs 69 are soldered to the connecting lands 71. The stator coil 66 thus fixed on the printer board 40, and is concurrently connected to the circuit on the printed board 40.

The lower ends of the supporting shafts 76, 77 are respectively press fitted into the bosses 33, 34 for receiving a shaft formed on the lower half 29, and the upper ends of these supporting shafts 76, 77 are respectively supported by the supporting bosses 78, 79 formed on the lower surface of the upper half 28. These supporting shafts 76, 77 are separately inserted into the insertion holes 42, 42 formed on the printed board 40 respectively. Intermediate gears 80, 81 are rotatably supported on the supporting shafts 76, 77 respectively. The intermediate gears 80, 81 respectively comprise large gears 80a, 81a and small gears 80b, 81b formed integrally with each other, and the large gear 80a of the intermediate gear 80 engages the driving gear 75, and the small gear 80b engages the large gear 81a of the intermediate gear 81, and the small gear 81b of the intermediate gear 81 engages with the sector gear 46 of the output gear portion 44 (See FIG. 3).

The revolving shaft 64 that is the center of rotation of the motor 61 is rotatably supported by the bearing sleeve 62 fixed to the boss 32 for receiving a shaft formed on the case body 12 (lower half 29). Thus, the gears 75, 80, 81, and 46 can be assembled at the designed distances with each other by fixing the shafts 76, 77, 37 for defining the centers of rotation of the driving gear 75 fixed to the revolving shaft 64 of the motor 61 and the respective gears 80, 81, 46 connected to the driving gear 75 to the bosses 33, 34, 31 for receiving a shaft formed on the case body 12 (lower half 29) respectively. Accordingly, since rotation of the motor 61 is transmitted smoothly to the tail end gear 46, there is no loss in rotation of motor 61. Thus power consumption is reduced, and gear sound is reduced, so that quite drive is realized.

When a power is supplied from the power supply, not shown, to the stator coil 66 of the brushless motor 61 via the printed board 40 connected to be capable of being energized, the rotor 65 rotates, and then the driving gear 75 that is coaxial with the rotor 65 rotates, which then rotates the sector gear 46 of the output gear portion 44 via the intermediate gears 80, 81. Therefore, the revolving shaft 16 formed integrally with the output gear portion 44 rotates. Consequently, the lamp body 3 also rotates and the direction of irradiation is changed in the horizontal direction.

Even when the lamp body 3 rotates, power feeding to the light source bulb 23 is maintained by sliding contact between the fixed contact points 17 and the rotary contact points 20, 20 having a slap ring construction. Also, the power supply cable 27 rotates with the lamp body 3 in its entirety. Therefore, no kinking of the power supply cable 27 occurs, and no stress is exerted on the power supply cable 27 with rotation of the lamp body 3. Though shavings may be generated from one or both of the fixed contact points 17 and the rotary contact points 20 by the sliding contact between the fixed contact points 17 and the rotary contact points 20, the shavings are collected into the recesses 56 formed so as to surround the fixed contact points 17, and do not fly off around.

Then, as described above, when the lamp body 3 rotates, simultaneously, the rotary disk 39 of the potentiometer 36 is rotated via the connecting spring 47. Accordingly, the value of resistance supplied from the potentiometer 36 varies, and thus the orientation of the lamp body 3 can be known. In order to find the orientation of the lamp body 3 accurately from the value of resistance that is supplied by the potentiometer 36, the orientation of the lamp body 3 have to coincide with the position of the rotary disk 39 of the potentiometer 36. In other words, the position of rotation of the rotary disk 39 with respect to the baseboard 38 should be adjusted so that the potentiometer 36 outputs the value of resistance showing the neutral condition when the lamp body 3 is at the neutral position, or when it faces toward the front, for example. On a design bases, the orientation of the lamp body 3 and the orientation of the rotary disk 39 of the potentiometer 36 coincide with each other if it can be assembled as designed, however, the orientation of the lamp body 3 and the orientation of the rotary disk 39 do not necessarily coincide because of the accumulation of tolerances and variations between potentiometers 36. Therefore, so called zero position adjustment of the potentiometer 36 is required when the lamp body is located at a neutral position and the value of resistance indicating that the lamp body 3 is at the neutral position (zero position signal) is supplied.

Figure 6:
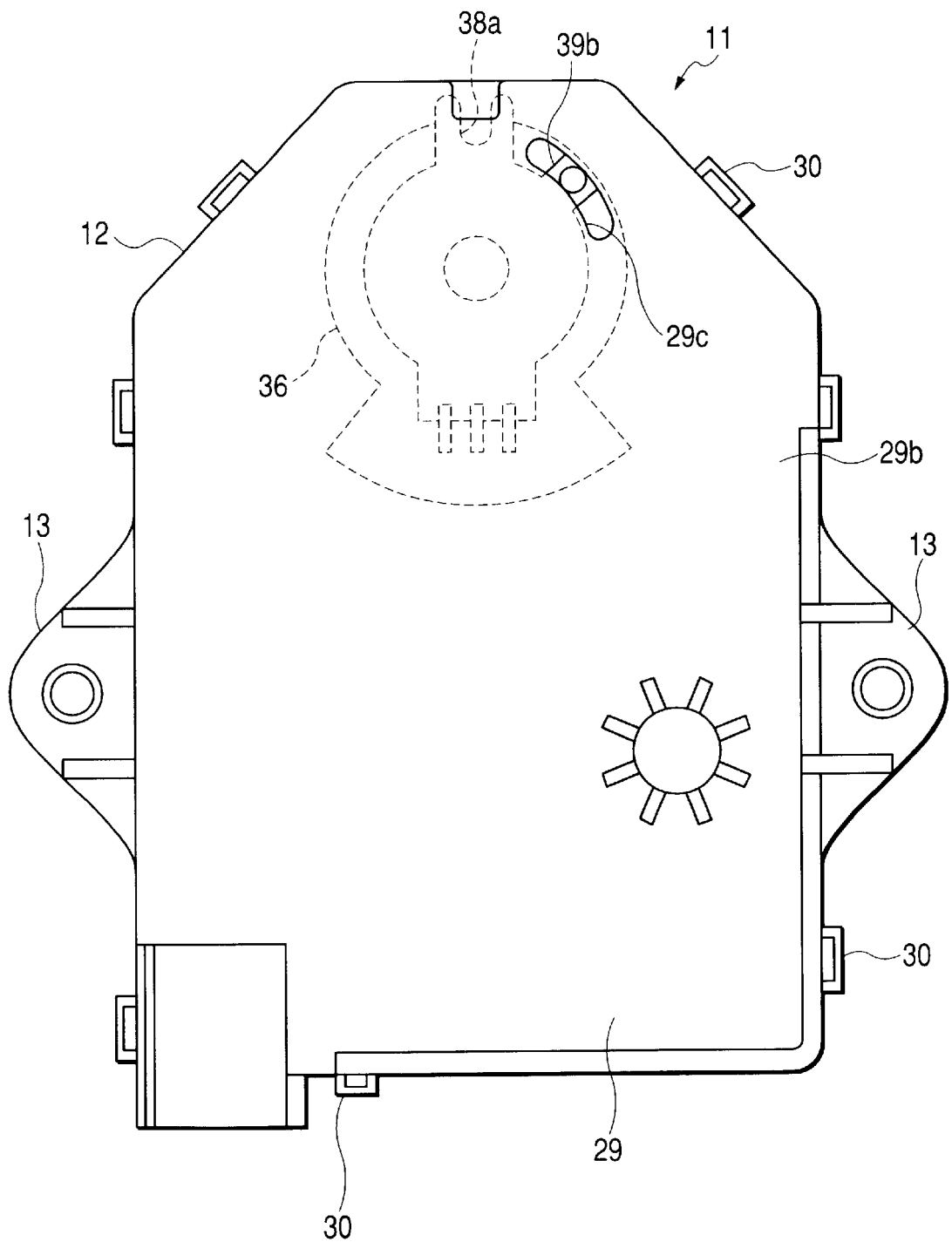
FIG. 6 is a bottom view of the driving unit according to an embodiment of the present invention.

Therefore, the motor 61 is driven and rotated to the position where the potentiometer 36 outputs a zero position signal. Then, a jig such as a pin is inserted into the case body 12 from the arc-shaped hole 29c (See FIG. 6), which is formed on the bottom wall 29b of the lower half 29 of the case body 12 so that the jig is engaged into the hole on the projection 39b for adjustment projecting from the side surface of the rotary disk 39 and fixed in this state so that the jig does not move. The hole 29c is formed into arc-shape about the axis of the boss 31 for receiving a shaft formed on the lower half 29. As described above, after the projection 39b for adjustment is fixed by the jig, the motor 61 is actuated again to rotate the lamp body 3, so that the lamp body 3 is positioned at the neutral position. Since the rotary disk 39 of the potentiometer 36 cannot be rotated because the position of the projection 39b for adjustment is fixed by the jig, slippage occurs between the rotary disk 39 and the connecting spring 47 (clutch means) and thus only the lamp body 3 rotates. Consequently, the orientation of the lamp body 3 accurately coincides with the orientation of the rotary disk 39 of the potentiometer 36.

In the embodiment described above, a brushless motor is used as a driving source, it may be a motor of the type other than the brushless motor, or it may be a driving source other than the motor, such as a solenoid or the like.

The configurations or constructions of the respective components shown in the embodiment described above are shown simply as an example of embodiments of the present invention, and thus it is to be distinctly understood that the technical field of the present invention is not limited thereto.

As is clear from the description above, the vehicle lamp of the present invention includes an optical means whereof the direction of irradiation is changed by rotation, a motor, an output shaft for driving the optical means, and a rotation transmitting mechanism for transmitting rotation from the motor to the output shaft. The motor, the output shaft, and the rotation transmitting mechanism are accommodated in the case body, and the revolving shaft of the motor is supported by the case body.

Therefore, in the vehicle lamp according to the present invention, since the revolving shaft of the motor is supported by the case body, the relative position of each shaft depends on the accuracy of the casing, which supports the output shaft and the shaft of the rotation transmitting mechanism. Therefore, inter-shaft pitches can be accurately defined by increasing dimensional precision of the mold for the case body.

In addition, the rotary driving apparatus according to the present invention is a rotary driving apparatus for rotating the optical means whereof the direction of irradiation is changed by rotation. The invention includes a motor, an output shaft for driving the optical means, and a rotation transmitting mechanism for transmitting rotation from the motor to the output shaft. The motor, the output shaft, and the rotation transmitting mechanism are accommodated in the case body, and the revolving shaft of the motor is supported by the case body.

Therefore, in the rotary driving apparatus of the present invention, the revolving shaft of the motor is supported by the case body. Thus, the relative position of each shaft depends on the accuracy of the casing, which supports the output shaft and the shaft of the rotation transmitting mechanism. Therefore, inter-shaft pitches can be accurately defined by increasing the dimensional precision of the mold for the case body.

According to an embodiment of the present invention, the rotation transmitting mechanism is a gear reducing mechanism, and the supporting shaft of the intermediate gear interposed between the motor and the output shaft is directly supported by the case body. Therefore, the assembling error of the rotation transmitting mechanism can be reduced, and the accurate inter-shaft pitches between the intermediate gears are ensured.

According to another embodiment of the present invention, the motor is a brushless motor, the revolving shaft is preloaded, and an urging force exerted on the revolving shaft by the preload is received by the thrust shaft interposed between the revolving shaft and the case body. Therefore, no backlash occurs on the rotor of the brushless motor, and smooth rotation is ensured.

What is claimed is:

1. A vehicle lamp comprising:
    an optical system whereof the direction of irradiation is changed by rotation;
    a first shaft coupled to the optical system to rotate the optical system;
    a brushless motor; and
    a rotation transmitting mechanism coupled to the brushless motor and the first shaft for transmitting rotation from the brushless motor to the first shaft;
    wherein the brushless motor and the rotation transmitting mechanism are accommodated in a case body, and a second shaft of the brushless motor is supported by the case body, the second shaft is preloaded with an urging force, and the urging force exerted on the second shaft is received by a thrust bearing interposed between the second shaft and the case body.

2. The vehicle lamp according to claim 1, wherein the rotation transmitting mechanism comprises a gear reducing mechanism and a supporting shaft of an intermediate gear internosed between the brushless motor and the first shaft is supported directly by the case body.

3. A rotary driving apparatus for rotating an optical means to change the direction of irradiation comprising:
    a brushless motor;
    a first shaft to rotate the optical means; and
    a rotation transmitting mechanism coupled to the brushless motor and the first shaft for transmitting rotation from the brushless motor to the first shaft:
    wherein the brushless motor and the rotation transmitting mechanism are accommodated in a case body, and a second shaft of the brushless motor is supported by the case body, the second shaft is preloaded with an urging force, and the urging force exerted on the second shaft is received by a thrust bearing interposed between the second shaft and the case body.

4. The rotary driving apparatus according to claim 3, wherein the rotation transmitting mechanism comprises a gear reducing mechanism, and a supporting shaft of an intermediate gear interposed between the brushless motor and the first shaft is supported directly by the case body.

5. A vehicle lamp comprising:
    an optical system for emitting light;
    a bracket with extending arms to pivotally hold the optical system;
    a first shaft coupled to the optical system through one of the arms to pivot the optical system;
    a contact plate disposed around the first shaft below one of the arms of the bracket, said contact plate being coupled to the first shaft to pivot integrally with the optical system;
    a rotation transmitting mechanism coupled to the first shaft to transmit rotating force to the first shaft;
    a motor coupled to the rotation transmitting mechanism; and
    a case to integrally accommodate the motor and the rotation transmitting mechanism, and the case supporting the first shaft.

6. The vehicle lamp according to claim 5, wherein the rotation transmitting mechanism comprises a gear reducing mechanism.

7. The vehicle lamp according to claim 5 further comprising:
    a supporting shaft of an intermediate gear interposed between the motor and the revolving shaft and supported directly in the case.

8. The vehicle lamp according to claim 5 wherein the motor is a brushless motor.

9. The vehicle lamp according to claim 5 further comprising:
    a second shaft coupled to the brushless motor and preloaded with an urging force;
    a thrust bearing interposed between the second shaft and the case to prevent backlashing force being imparted by the second shaft.

10. The vehicle lamp according to claim 5 further comprising:
    a rotary arch-shape contact region surrounding the first shaft and disposed on the case, said contact plate disposed over and pivotally contacting the rotary arch-shape contact region for receiving electrical power through the rotary arch-shape contact region.

11. The vehicle lamp according to claim 10 further comprising:
    a power cable connecting the contacting plate and the optical system.

12. The vehicle lamp according to claim 5 wherein the bracket is rigidly mounted on the case so as to not pivot with the optical system.

13. A vehicle lamp comprising:
    a bracket;
    a lamp body being rotatably and horizontally supported by the bracket;
    an optical means, the direction of irradiation of which is changed by rotation; and
    a rotary driving apparatus being supported by the bracket for rotating the optical means, the rotary driving apparatus including:
        a motor;
        a first shaft for driving the optical means, said first shaft being directly connected to the lamp body; and
        a rotation transmitting mechanism coupled to the motor and the first shaft for transmitting rotation from the motor to the first shaft,
        wherein the motor, the first shaft, and the rotation mechanism are accommodated in a case body, and a second shaft of the motor is supported by the case body.

14. The vehicle lamp according to claim 13, wherein the rotating transmitting mechanism is a gear reducing mechanism and a supporting shaft of an intermediate gear interposed between the motor and the first shaft is supported directly by the case body.

15. The vehicle lamp according to claim 13, wherein the motor is a brushless motor, the second shaft is preloaded, and an urging force exerted on the second shaft by the preload is received by a thrust bearing interposed between the second shaft and the case body.

16. The vehicle lamp according to claim 13, wherein the first shaft of the rotary driving apparatus is connected to a connecting hole opened at a lower surface of the lamp body.

* * * * *